US008984113B2

United States Patent
Li et al.

(10) Patent No.: US 8,984,113 B2
(45) Date of Patent: Mar. 17, 2015

(54) INTERNET OF THINGS SERVICE ARCHITECTURE AND METHOD FOR REALIZING INTERNET OF THINGS SERVICE

(75) Inventors: Hui Li, Shenzhen (CN); Xiaojiang Xing, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 226 days.

(21) Appl. No.: 13/642,139

(22) PCT Filed: Mar. 10, 2011

(86) PCT No.: PCT/CN2011/071689
§ 371 (c)(1),
(2), (4) Date: Oct. 19, 2012

(87) PCT Pub. No.: WO2011/134318
PCT Pub. Date: Nov. 3, 2011

(65) Prior Publication Data
US 2013/0041997 A1     Feb. 14, 2013

(30) Foreign Application Priority Data

Apr. 30, 2010  (CN) .......................... 2010 1 0165967

(51) Int. Cl.
*G06F 15/16*    (2006.01)
*H04W 4/00*     (2009.01)
*H04L 29/08*    (2006.01)

(52) U.S. Cl.
CPC ............... *H04W 4/005* (2013.01); *H04L 67/12* (2013.01)
USPC ........... 709/223; 709/201; 709/204; 709/225; 709/224

(58) Field of Classification Search
CPC ....................... G06Q 20/102; H04N 21/25808
USPC ................................................. 709/223, 202
See application file for complete search history.

(56) References Cited

U.S. PATENT DOCUMENTS

2002/0161707 A1*  10/2002  Cole et al. ........................ 705/42
2006/0136490 A1*   6/2006  Aggarwal et al. ......... 707/103 R
(Continued)

FOREIGN PATENT DOCUMENTS

CN      1761320 A        4/2006
WO   2008134810 A1      11/2008

OTHER PUBLICATIONS

Hu Changwei, et al. Research on Internet of Things (IOT) Operation Support Platform Solutions. Information and Communication Technologies. Apr. 15, 2010. No. 15, pp. 52-57. ISSN 1674-1285.
Ye Yuanhong. The Design and Realization of M2M terminal Management System. Master thesis of Chongqing University. Oct. 10, 2009. pp. 5-15.
International Search Report for PCT/CN2011/071689 dated May 20, 2011.
Jan Audestad et al. "Connected Objects Platform Specification, Version I"; R&I Research Report, R Feb. 2009; XP 14153817A I ; ISBN / ISSN: 978-82-423-0618-0 / 1500-2616; Feb. 18, 2009; See the whole document.

(Continued)

*Primary Examiner* — Jude Jean Gilles
(74) *Attorney, Agent, or Firm* — Ling Wu; Stephen Yang; Ling and Yang Intellectual Property (57) ABSTRACT

The present invention discloses the architecture of an internet of things (IOT). The architecture includes multiple levels of IOT service platforms, wherein a superordinate IOT service platform is configured to manage one or more of the following function entities: IOT terminal, IOT terminal gateway, subordinate IOT service platform, special service platform and service gateway. The present invention also discloses a method for implementing an IOT service. The method includes the steps of: the superordinate IOT service platform providing management for one or more of subordinate IOT service platform, special service platform and service gateway, wherein the management includes one or more of: registration, login, logout, data synchronization and heartbeat. With the present invention, the deployed industries or special service platforms can be integrated into a unified architecture, thus lightening the burden of the IOT service platforms.

17 Claims, 6 Drawing Sheets

(56) References Cited

U.S. PATENT DOCUMENTS

| | | | |
|---|---|---|---|
| 2007/0214208 A1* | 9/2007 | Balachandran | 709/201 |
| 2008/0040418 A1* | 2/2008 | Power | 709/202 |
| 2008/0275995 A1* | 11/2008 | Soliman et al. | 709/230 |
| 2010/0002606 A1* | 1/2010 | Preis et al. | 370/259 |
| 2013/0041997 A1* | 2/2013 | Li et al. | 709/223 |
| 2014/0136399 A1* | 5/2014 | Gaulin | 705/39 |

OTHER PUBLICATIONS

"Report on potential for standardization of M2M (Machine-to-Machine communications) at ETSI"; XP 14090413A I, Version 0.13—Nov. 12, 2008; See the whole document.

* cited by examiner

INTERNET OF THINGS SERVICE ARCHITECTURE AND METHOD FOR REALIZING INTERNET OF THINGS SERVICE

TECHNICAL FIELD

The present invention relates to the field of communication technology, and in particular, to an architecture of an internet of things (IOT) service and a method for implementing an IOT service.

BACKGROUND ART

With the rapid development of communication technology and further fusion of the communication technology with the Internet technology, the popularity rates of mobile services and mobile Internet technology become higher and higher. At present, the mobile communication permeability in most developed countries is even up to 100%, thus causing the increase rate of mobile users to become lower and lower, which is a problem which the global mobile operators are all basically faced with. Therefore, operators begin to seek for new increase points in the mobile communication field. On the other hand, with the rise of Internet technology, especially the rise of mobile Internet technology generated from fusion of Internet technology with mobile communication technology, a new door is opened for operators to further expand their revenue and market.

From the current emerging services, Machine-to-Machine, Machine-to-Man, and Man-to-Machine (M2M) services may become a killer service in the 3rd Generation (3G) technology and even in the 4th Generation (4G) technology. According to the prediction of a professional institute, M2M service will have a wide market in the future. Currently, operators, equipment suppliers and service providers at home and abroad actively are engaged in development and promotion of M2M services.

Currently, in the mobile communication filed and fixed communication field, concepts similar to M2M include internet of things and ubiquitous network, and M2M network includes a machine-to-machine communication network, a man-to-machine communication network and a machine-to-man communication network. Ubiquitous network refers to all information interaction networks including sensor networks, industrial control networks, broadcasting TV networks and satellite communication networks other than communication networks. In view of the range, M2M is a concept with the smallest concept range, followed by the internet of things and then ubiquitous network. Among the three concepts, one of the common points is including a terminal device (also called as a M2M terminal, an IOT terminal, or a ubiquitous network terminal, and the M2M terminal is used in the present invention) and a terminal gateway device (also called as an M2M gateway, an IOT gateway, a ubiquitous network gateway, a sensor gateway, an M2M terminal gateway, an IOT terminal gateway device or a ubiquitous network terminal, and the term of M2M terminal gateway is used in the present invention). Wherein, on one hand the M2M terminal gateway device is used to access a communication network, for example, Global System for Mobile Communications (GSM) network, Code Division Multiple Access (CDMA) network, an Internet, 3G, 4G, fixed communication network, and Wireless Local Area Network (WLAN), etc. On the other hand, the M2M terminal gateway device is used to access other networks, for example, sensor network, personal area network, fused personal network, home network, enterprise network, industrial control network, broadcasting TV network and satellite communication network, etc. In the present invention, the M2M service network is also equivalent to the IOT service network and ubiquitous network service network. Specially, the M2M is taken as the main description object in the present invention.

Figure 1:
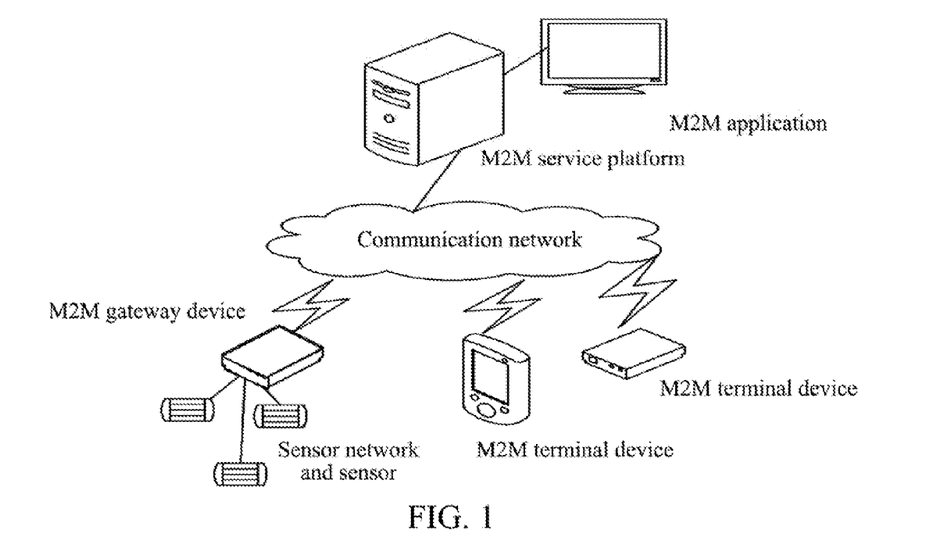
FIG. 1 illustrates the architecture of an M2M service system in the prior art.

FIG. 1 illustrates the common M2M service application architecture at present, and the architecture includes: an M2M machine terminal access layer, a communication network\IP network layer, an M2M service platform layer and M2M application, wherein:

the M2M machine terminal access layer may be divided into two types: the first type is M2M terminal device, the first step of implementing the M2M service is the terminal device collecting data, sending out the collected data through the network, and receiving data issued by the network. Commonly, for a mobile network, a communication module is used to achieve communication with the M2M terminal, and the machine hardware is a device used to implement the M2M service; for a fixed communication network, the fixed network may be accessed by means of a network card or a modem; the second type is a M2M terminal gateway device, which, on one hand, is used to connect to the communication network (mobile communication network or fixed communication network), and on the other hand to connect to other networks, including sensor network, industrial control network, personal area network, fused personal network, satellite network, home network or enterprise network. For this type of devices, it can play the function of performing service upload and issuing, as well as data processing, control and protocol conversion, etc. by agenting and adapting the devices of other networks, for example the sensor.

Communication network\IP network: the communication network\IP network is used to transmit the M2M service data between M2M machine terminals, or play a role of connection network between the M2M machine terminal and the third-party service platform and application, and plays an important part in the whole M2M technology frame. The communication network\IP network comprises mobile communication network, broadband network, wide area network, local area network and personal area network, etc.

M2M service platform: since the M2M service needs to support many different industries, enterprise applications and home applications, based on the service capability of the M2M service platform, the M2M service platform needs to provide basic gateway service capability and M2M service environment invocation for a large number of third-party M2M application systems. The gateway service capability comprises: management, monitoring of terminals, data collection and protocol conversion, etc. As for the gateway service capability, the service platform generally has limited capability and the provided functions are simple, and thus can only support common and simple M2M applications; the M2M service environment capability generally comprises many capabilities, such as supporting establishment, edition, arrangement, generation and release of services, and these service environment capabilities are based on existing various different specific individual service capabilities, such as a large number of existing service capabilities including positioning, Geographic Information System (GIS), message, representation and Direct Message (DM). Through the logic of service environment, enhanced service capability can be provided to meet complicated M2M applications.

M2M application: M2M services can be widely applied to various industries, including large-scale enterprise application, medium-sized and small enterprise application, personal and home users, etc., and cover fields such as telemedicine, remote meter reading, public security and so on. For different industries and enterprise users, their requirements on the specific application may greatly vary with obvious differentiations, therefore, M2M application is generally developed by the users themselves, and the operators only provide standardized and universal service applications.

Since the M2M service involves many industries, and each industry uses a different application logic, each industry wishes to use its own special service platform for providing services. If a set of special service platform is deployed for each industry, the cost for M2M application promotion will be too high.

Currently, some operators already use a universal M2M service platform to provide comprehensive M2M services, i.e., an M2M service platform manages the entire network as an overall service platform, accesses the whole M2M terminal and M2M terminal gateway (called as M2M gateway in short), and provides M2M services for the entire network. Therefore, this M2M service platform needs to provide all capabilities. However, the operators only make consideration from the following two aspects when establishing the M2M platform:

one, providing basic M2M service environment for some big customers and large industry applications, and providing service redevelopment capabilities for the big customers and large industry applications;

two, for some medium-sized and small enterprises, home and personal users, since their economy capabilities are seek, it is less possible to perform second development based on the service capabilities provided by the operators, so the operators can provide some standardized M2M applications.

With the enlargement of M2M serviced volume, the operators will face with the following problems when using a universal M2M service platform to provide M2M services:

(1) Only one universal M2M service platform is deployed in the whole network, and it is hard to manage the M2M terminals and M2M terminal gateway of the whole network, mainly because the regional span is large, the number of application types is big, the load is not balanced, and problems such as single-point failure tends to occur.

(2) Currently, many industry applications are provided with respective industry or special service platforms, and these users do not want to give up the operated platform and completely reestablish an M2M service platform, and generally speaking, the service platforms established by these users themselves usually provide applications of specific industries or specific fields, for example, video monitoring, etc.

(3) As for specific applications, for example, a M2M service of large amount volume, a typical example is that an M2M terminal device collects video-type data, and at this moment the service data are generally not suitable to reach the applications via the M2M service platform.

(4) As for applications of high real time, for example, M2M applications of industrial automation control type, M2M applications of financial transaction, and the like, they all require high real time.

(5) A gateway needs to be provided for some special applications, for example, a plurality of terminals can access the same gateway, and then the gateway collects data and reports the data to the M2M service platform.

SUMMARY OF THE INVENTION

The technical problem to be solved in the present invention is to provide an architecture of an internet of things (IOT) and a method for implementing an IOT service so as to develop the IOT services.

In order to solve above technical problem, an architecture of an internet of things (IOT) of the present invention comprises: multiple levels of IOT service platforms, wherein a superordinate IOT service platform is configured to manage one or more of the following function entities:

an IOT terminal, an IOT terminal gateway, a subordinate IOT service platform, a special service platform and a service gateway.

The special service platform is configured to provide one or more of the following functions: video service, audio service, streaming media service, large data volume service, high real time service and industry application;

the service gateway is configured to converge data.

Management functions provided by the superordinate IOT service platform for one or more of the subordinate IOT service platform, special service platform and service gateway comprise one or more of: registration, login, logout, data synchronization and heartbeat.

Service data provided by the superordinate IOT service platform for the subordinate IOT service platform and\or special service platform further comprise at least one of: service policy, service parameter, service configuration parameter, service content and service subscription data.

The IOT service platform and\or special service platform is further configured to provide the IOT terminal and the IOT terminal gateway with at least one of the following functions: registration, login and logout.

The data synchronization comprises at least one of the following:

the superordinate IOT service platform synchronizing data to the subordinate IOT service platform or special service platform;

the subordinate IOT service platform or special service platform synchronizing data to the superordinate IOT service platform.

The M2M service platform or the special service platform is configured to provide registration to the M2M terminal and M2M terminal gateway in the following manner:

judging whether a registration message is processed by the M2M service platform or the special service platform;

if yes, processing the registration message to the M2M terminal or M2M terminal gateway; if not, delivering the registration message to a superordinate M2M service platform or special service platform.

The service gateway is configured to provide the IOT terminal and the IOT terminal gateway with at least one of the following functions: registration, login and logout.

The service gateway is configured to provide registration to the IOT terminal and IOT terminal gateway in the following manner:

receiving a registration message sent from the IOT terminal or IOT terminal gateway; and delivering the registration message to a superordinate IOT service platform or special service platform of the service gateway.

The IOT service platform or special service platform is configured to provide login to the IOT terminal and IOT terminal gateway in the following manner:

receiving a login message sent from the IOT terminal or IOT terminal gateway to the IOT service platform or special service platform; and the IOT service platform or special service platform judging whether the login message is to be processed by the IOT service platform or special service platform;

if yes, the IOT service platform or special service platform processing the login message to the IOT terminal or the IOT terminal gateway; if not, delivering the login message to a superordinate IOT service platform of the IOT service platform and special service platform, or the IOT service platform delivering the login message to the special service platform.

The service gateway is configured to provide login to the IOT terminal and IOT terminal gateway in the following manner:

receiving a login message sent from the IOT terminal or IOT terminal gateway; and delivering the received login message to a superordinate IOT service platform or special service platform.

The IOT service platform or special service platform is configured to provide logout to the IOT terminal and IOT terminal gateway in the following manner:

receiving a logout message sent from the IOT terminal or IOT terminal gateway; and judging according to the logout message whether the logout message is processed by the IOT service platform or special service platform to the IOT terminal or IOT terminal gateway;

if yes, the IOT service platform or special service platform processing the logout message to the IOT terminal or IOT terminal gateway; if not, delivering the logout message to a superordinate IOT service platform or special service platform.

The service gateway is configured to provide logout to the IOT terminal and IOT terminal gateway in the following manner:

receiving a logout message sent from the IOT terminal or IOT terminal gateway; and delivering the logout message to a superordinate IOT service platform or special service platform.

The IOT service platform or special service platform is configured to make judgment according to one or more of the following information in the message sent by the IOT terminal or IOT terminal gateway:

IOT gateway device identifier, IOT gateway device type, IOT terminal identifier, IOT terminal type, application type, application identifier and subscription information.

The IOT comprises one or more of M2M network, ubiquitous network and sensor network.

In order to solve the above technical problem, the method for implementing an IOT service in the present invention comprises:

a superordinate IOT service platform providing management for one or more of a subordinate IOT service platform, a special service platform and a service gateway, wherein the management comprises one or more of: registration, login, logout, data synchronization and heartbeat.

The method further comprises:

the superordinate IOT service platform providing one or more of the subordinate IOT service platform, the special service platform and the service gateway with one or more of the following data:

IOT service policy, IOT service parameter, IOT service configuration parameter, IOT service content and IOT service subscription data.

The method further comprises:

the IOT service platform and the special service platform providing the IOT terminal and the IOT terminal gateway with at least one of the following services: registration, login and logout.

The method further comprises:

the IOT service platform and\or special service platform judging whether messages or data sent from the IOT terminal or IOT terminal gateway are processed by the IOT service platform and\or special service platform according to one or more of the following data:

IOT gateway device identifier, IOT gateway device type, IOT terminal identifier, IOT terminal type, application type, application identifier and subscription information.

The IOT comprises one or more of M2M network, ubiquitous network and sensor network.

In conclusion, in the present invention, the multiple levels of network service platforms are deployed distributed, each level of platform is provided with the same or differentiated service platform functions to provide development of IOT services by coordination, and multiple levels of IOT service platforms are deployed and the IOT terminals of the whole network are managed level to level, thus solving the problems of the IOT terminals that the regional span is large, the number of application types is big, and the load is not balanced, and the deployed industry or special service platforms can be fused into a unified architecture, the IOT service applications of large data volume and high real time can be implemented separately, thus reducing the load of the IOT service platforms.

PREFERRED EMBODIMENTS OF THE INVENTION

The specific embodiments of the present invention will be described in detail below with reference to the drawings. It should be pointed out that the examples and features in the examples in the present application can be combined in any way without conflict.

This example provides an architecture of an IOT, which comprises: multiple levels of IOT service platforms, wherein a superordinate IOT service platform is configured to manage one or more of the following function entities:

an IOT terminal, an IOT terminal gateway, a subordinate IOT service platform, a special service platform and a service gateway.

It should be pointed out that the technical scheme of the present invention can be applied to an IOT, which may comprise one or more of M2M network, ubiquitous network and sensor network. The preset invention will be further described below by taking the M2M network as an example, but the technical scheme of the present invention is not limited to the M2M network.

Figure 2:
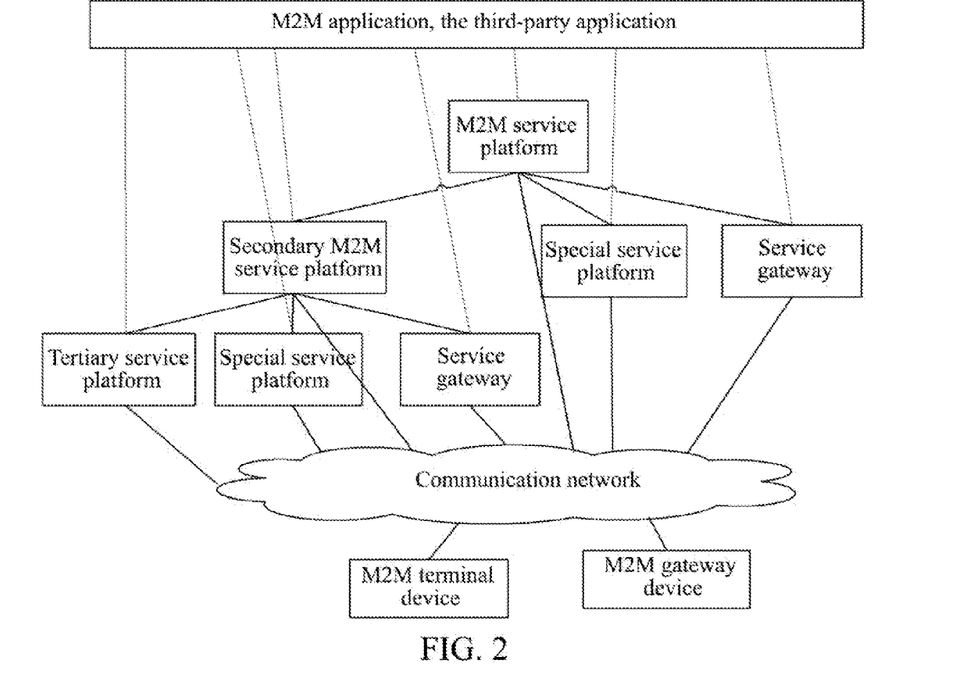
FIG. 2 illustrates the structure of the network architecture for implementing an M2M service according to an embodiment of the present invention.

FIG. 2 illustrates the architecture for implementing an M2M service in this embodiment, and the network side comprises: M2M service platforms, special service platforms and service gateways.

Wherein, the M2M service platforms are cascaded together in a multi-level fashion, and each level of M2M service platform can provide M2M service processing, and meanwhile each level of M2M service platform can also manage the subordinate M2M service platform, and can support management for accessed special service platform and service gateway. Among the hierarchical M2M service platforms, the M2M service platform of the highest level is the network-wide M2M service platform and can access M2M terminal devices and M2M gateway devices distributed across the network, and other levels of M2M service platforms, special service platforms and service gateways can also access the M2M terminal devices and M2M gateway devices respectively.

In addition, each level of M2M service platform, special service platform and service gateway can also directly provide M2M service access for the third-party applications.

Regarding the special service platform, it is generally a platform for providing special services, for example, specially providing service functions including audio processing, video processing, streaming media service processing, image processing, large data volume processing, high real-time service and industry application. The service data of the special service platform are generally directly provided to the third-party application. In this example, the data of the special service platform can also be delivered to the M2M service platform for further processing. The special service platform may also be some service platforms for providing industry applications or field applications, for example service platforms separately constructed for services such as intelligent home furnishing, video monitoring, traffic, and logistics.

Service gateway is generally used to converge data, and directly transparently transmit the data to the superordinate M2M service platform or directly deliver the data to the third-party M2M application. The service gateway per se only provides limited or entire service processing or does not provide processing of service logic. If the service gateway can only provide limited service processing capability or does not process the service, the service processing function will be provided by the superordinate M2M service platform or special service platform or will be provided by the third-party application.

In this embodiment, the special service platform and service gateway both directly access the superordinate M2M service platform or special service platform, and the superordinate M2M service platform or special service platform directly provide management and services.

The superordinate M2M service platform accesses the subordinate M2M service platform or special service platform, and provides functions such as registration, login and logout for the subordinate service platforms (the M2M service platform and special service platform) and\or service gateway. Generally the superordinate M2M service platform provides some management services, for example managing the registration information of the subordinate M2M platform or special service platform or service gateway, including IP address, identifier, user name and password, etc.; in addition, the superordinate M2M service platform can also provide service data for the subordinate M2M service platform or special service platform or service gateway, for example, M2M service policy, M2M service parameter, M2M service configuration parameter, M2M service content, M2M service subscription data, M2M terminal gateway data and M2M terminal data, and so on.

In addition, the superordinate M2M service platform and the subordinate M2M service platform, special service platform and service gateway all should support heartbeat detection function, and unidirectional or bidirectional data synchronization function.

In addition, the M2M service platforms, the special service platform and service gateway should all provide functions including registration, login, logout and service processing to the M2M terminal or M2M gateway device.

As for the login, registration, logout and service processing messages transmitted by the M2M terminal gateway or M2M terminal, the special service platform, service gateway and M2M service platform should all determine whether the messages are to be processed by themselves or to be forwarded to the higher level to be processed by the higher-level M2M service platform or special service platform based on the identifier of the M2M terminal or M2M terminal gateway and the application identifiers in the messages, or according to the subscription information of the M2M terminal gateway and M2M terminal. Likewise, the higher-level M2M service platform or special service platform performs further judgment and processing.

Regarding the service data reported by the M2M terminal gateway or M2M terminal, the corresponding special service platform, or service gateway, or M2M service gateway also determines whether the service data is to be processed by the M2M service platform or special service platform or service gateway of the present level, or to be forwarded to the higher-level M2M service platform or special service platform for processing based on the identifier of the M2M terminal or the identifier of the M2M terminal gateway and the application identifier, or according to the subscription information of the M2M terminal gateway and M2M terminal. Likewise, the higher-level M2M service platform or special service platform performs further judgment and processing.

Figure 3:
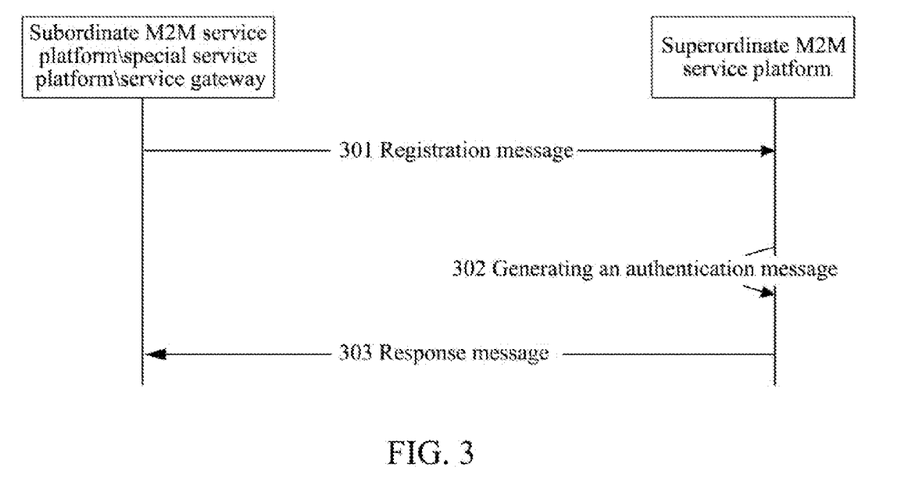
FIG. 3 is a flowchart of a platform-to-platform registration according to an embodiment of the present invention.

FIG. 3 is a flow of a subordinate M2M service platform, special service platform or service gateway registering to a superordinate M2M service platform, which comprises the following steps:

301, the subordinate M2M service platform, special service platform or service gateway sends a registration message to the superordinate M2M service platform to request for registration, and the registration message carries registration information such as the IP address and identifier of itself;

302, the superordinate M2M service platform accepts registration, stores registration information such as the IP address and identifier of the subordinate M2M service platform, special service platform or service gateway, and generates authentication information, for example user name and password, etc.;

303, the superordinate M2M service platform returns the authentication information to the subordinate M2M service platform, special service platform or service gateway through a response message.

Figure 4:
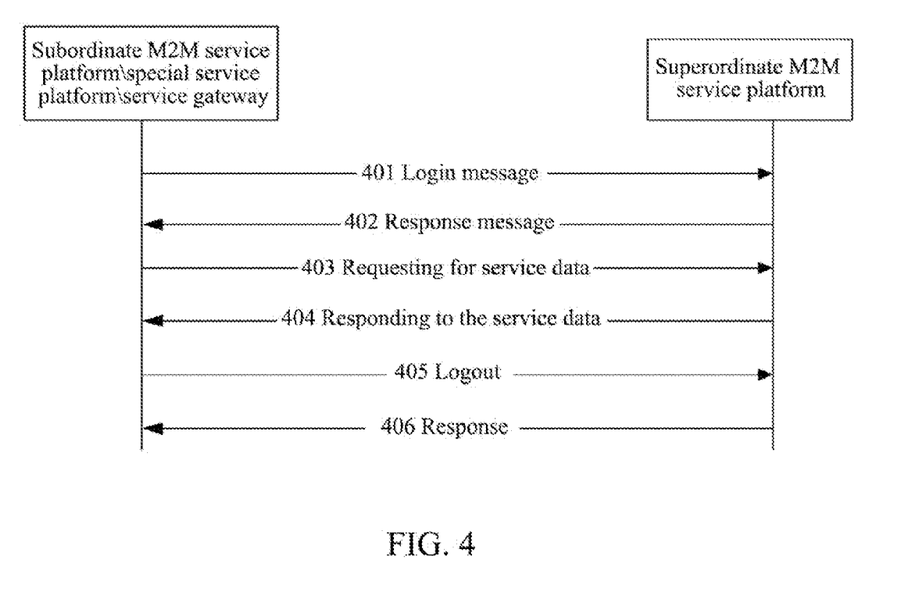
FIG. 4 is a flowchart of platform-to-platform login, logout, and transmission of service data according to an embodiment of the present invention.

FIG. 4 is a flow of platform-to-platform login, logout, and transmission of service data, which comprises the following steps:

401, the subordinate M2M service platform, special service platform or service gateway requests the superordinate M2M service platform for login according to the authentication information obtained during the registration;

402, the superordinate M2M service platform accepts the login, and sends a response message to the subordinate M2M service platform, special service platform or service gateway;

403, the subordinate M2M service platform, special service platform or service gateway requests the superordinate M2M service platform for service data;

the service data comprise one or more of: M2M service policy, M2M service parameter, M2M service configuration parameter, M2M service content and M2M service subscription data.

Figure 5:
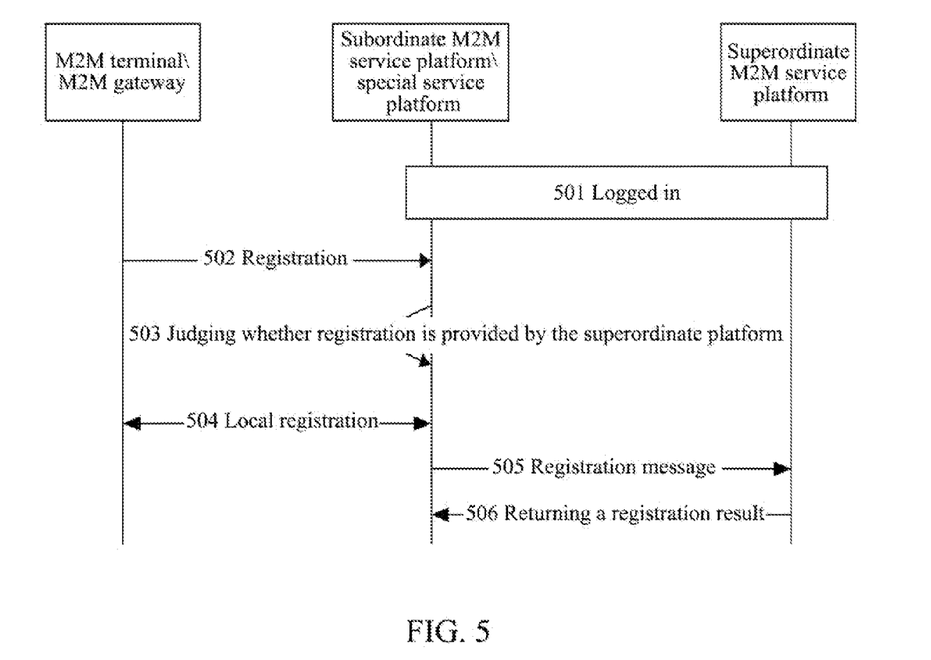
FIG. 5 is a flowchart of a terminal or gateway registering to a platform according to an embodiment of the present invention.

404, the superordinate M2M service platform returns the corresponding service data to the subordinate M2M service platform, special service platform or service gateway;

405, the subordinate M2M service platform, special service platform or service gateway can request the superordinate M2M service platform for logout;

406, the superordinate M2M service platform accepts the logout and makes a response. FIG. 5 is a flow of the M2M terminal device or M2M gateway device requesting the platform for registration, which comprises the following steps.

501, the subordinate M2M service platform and special service platform establish a connection with the superordinate M2M service platform;

502, the M2M terminal device or M2M gateway device sends a registration message to the subordinate M2M service platform (or any M2M service platform of other levels) or special service platform to request for registration, and the registration message comprises registration information such as the identifier of the M2M terminal device or M2M gateway device, application identifier and address, etc.;

503, the subordinate M2M service platform or special service platform judges, according to the registration information of the M2M terminal device or M2M gateway device, whether the M2M terminal device or M2M gateway device should be provided with the registration by itself or by the superordinate M2M service platform; if the registration is to be provided by itself, step 504 is executed, and if the registration is to be provided by the superordinate M2M service platform, step 505 is executed.

When judging whether the registration is to be implemented by itself or by the superordinate M2M service platform, for example, whether the registration is to be accepted by the present M2M service platform or the present special service platform is judged according to the related information in the registration message transmitted by the M2M terminal device or M2M gateway device, for example, one or more of M2M gateway device identifier, M2M gateway device type, M2M terminal identifier, M2M terminal type, application type, application identifier and subscription information; if not, the registration message is forwarded to the superordinate M2M service platform or special service platform.

504, if the registration service is to be provided by the present-level M2M service platform or special service platform, a registration response is returned to the M2M terminal device or M2M gateway device, where the response message includes some authentication information; end.

505, if the registration service is to be provided by the superordinate M2M service platform, the registration message is forwarded to the superordinate M2M service platform.

506, the superordinate M2M service platform or special service platform makes a judgment using the same judging mechanism in step 503. If the registration request of the M2M terminal device or M2M gateway device is to be processed by this M2M service platform or special service platform, a registration result is returned to the subordinate M2M service platform or special service platform.

Figure 6:
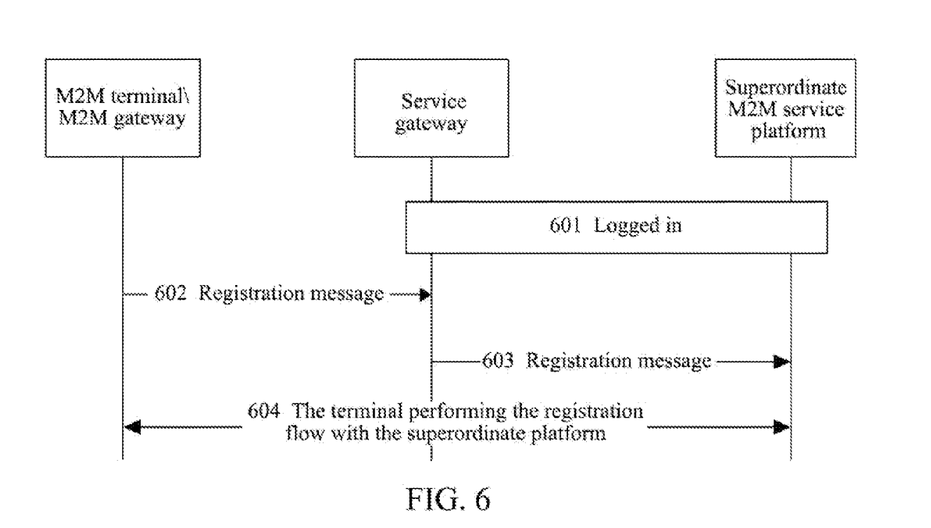
FIG. 6 a flowchart of a terminal or gateway registering to a service gateway according to an embodiment of the present invention.

FIG. 6 is a flow of the M2M terminal or M2M terminal gateway device registering to the service gateway, which comprises the following steps:

601, the service gateway has logged in to the superordinate M2M service platform and has established a connection;

602, the M2M terminal or M2M terminal gateway device sends a registration message to the service gateway to request for registration, and the registration message includes registration information such as the identifier of the M2M terminal or M2M terminal gateway and application identifier;

603, the service gateway directly forwards the registration message to the superordinate M2M service platform or special service platform;

604, the superordinate M2M service platform or special service platform performs the registration flow for the M2M terminal or M2M terminal gateway device, where the specific mechanism is the same as in step 503.

Figure 7:
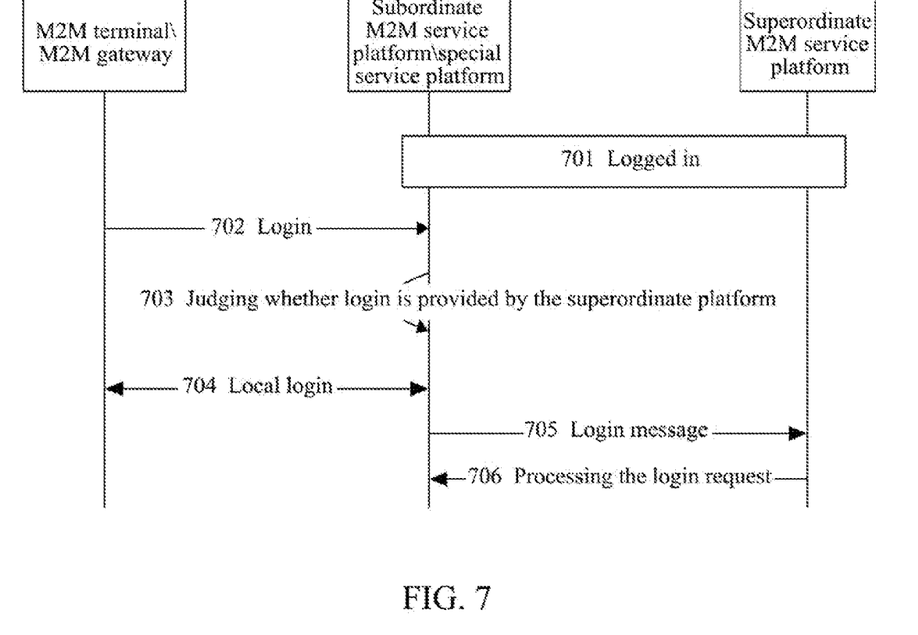
FIG. 7 is a flowchart of a terminal or gateway logging in to a platform according to an embodiment of the present invention.

FIG. 7 is a flow of the M2M terminal or M2M terminal gateway device logging into the platform, which comprises the following steps.

701, the subordinate M2M service platform or special service platform has established a connection with the superordinate M2M service platform;

702, the M2M terminal or M2M terminal gateway device sends a login message to the subordinate M2M service platform or special service platform to request for login, and the login message includes login information such as the identifier of the M2M terminal or M2M terminal gateway device, application identifier and login password;

703, the subordinate M2M service platform or special service platform judges whether the M2M terminal or M2M terminal gateway device should be provided with the login processing by the present M2M service platform or special service platform according to the related information in the login message transmitted by the M2M terminal or M2M terminal gateway device, for example, one or more of M2M gateway device identifier, M2M gateway device type, M2M terminal identifier, M2M terminal type, application type, application identifier and subscription information; if yes, step 704 is executed, and if not step 705 is executed, and the login message is forwarded to the superordinate M2M service platform or special service platform, and the login is provided by the superordinate M2M service platform;

for example, whether the login is to be accepted by the present M2M service platform or special service platform is judged according to the M2M terminal or M2M gateway identifier and the application identifier in the message; if not, the login message is uploaded to the superordinate M2M service platform or special service platform.

704, if the login service is to be provided by the present-level M2M service platform or special service platform, a login response is returned to the M2M terminal or M2M gateway; end.

705, if the login service is to be provided by the superordinate M2M service platform, the login message is forwarded to the superordinate M2M service platform;

706, the superordinate M2M service platform processes the login message of the M2M terminal or gateway, and the processing method is the same as in step 703.

Figure 8:
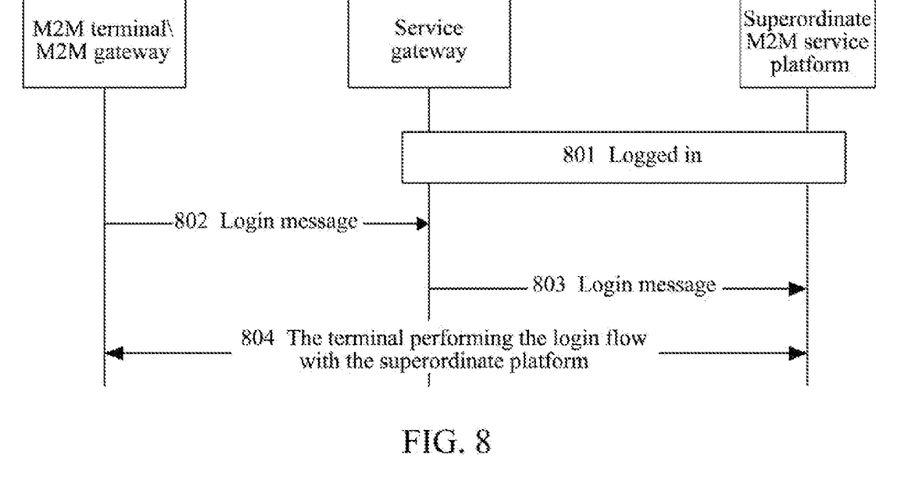
FIG. 8 is a flowchart of a terminal or gateway logging in to a service gateway according to an embodiment of the present invention.

FIG. 8 is a flow of the M2M terminal or M2M terminal gateway device logging into the service gateway, which comprises the following steps.

801, the service gateway has logged in to the superordinate M2M service platform and has established a connection;

802, the M2M terminal or M2M terminal gateway device sends a login message to the service gateway to request for login, and the login message includes login information such as the identifier of the M2M terminal or M2M terminal gateway device, application identifier and password;

803, the service gateway forwards the login message to the superordinate M2M service platform;

804, the superordinate M2M service platform implements the login flow with the M2M terminal or gateway, and the specific mechanism is the same as in step 703.

Figure 9:
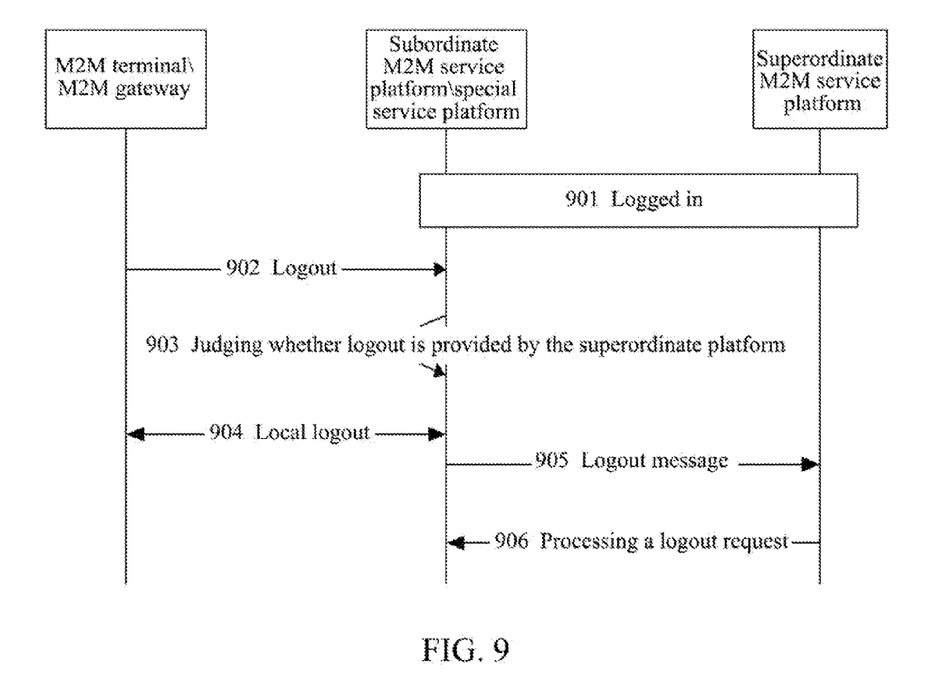
FIG. 9 is a flowchart of a terminal or gateway logging out to a platform according to an embodiment of the present invention.

FIG. 9 is a flow of the M2M terminal or M2M terminal gateway device logging out to the platform, which comprises the following steps:

901, the subordinate M2M service platform or special service platform has established a connection with the superordinate M2M service platform;

902, the M2M terminal or M2M terminal gateway device sends a logout message to the subordinate M2M service platform or special service platform to request for logout, and the logout message includes logout information such as the identifier of the M2M terminal or M2M terminal gateway device and application identifier;

903, the subordinate M2M service platform or special service platform judges whether the M2M terminal or M2M terminal gateway device should be processed by the present M2M service platform or special service platform according to the logout information of the M2M terminal or M2M terminal gateway device, and if yes, step 904 is executed, and if not, step 905 is executed and the logout message is forwarded to the superordinate M2M service platform or special service platform;

for example, whether the logout message is to be processed by the present M2M service platform or special service platform is judged according to the related information in the logout message of the M2M terminal or M2M terminal gateway device, for example, one or more of M2M gateway device identifier, M2M gateway device type, M2M terminal identifier, M2M terminal type, application type, application identifier and subscription information; if not, the logout message is uploaded to the superordinate M2M service platform.

904, if the logout service is to be provided by the present-level M2M service platform or special service platform, a logout response is returned to the M2M terminal or M2M terminal gateway device; end.

905, if the logout service is to be provided by the superordinate M2M service platform, the logout message is forwarded to the superordinate M2M service platform;

906, the superordinate M2M service platform processes the logout request of the M2M terminal or M2M terminal gateway device, and the mechanism is the same as in step 903.

Figure 10:
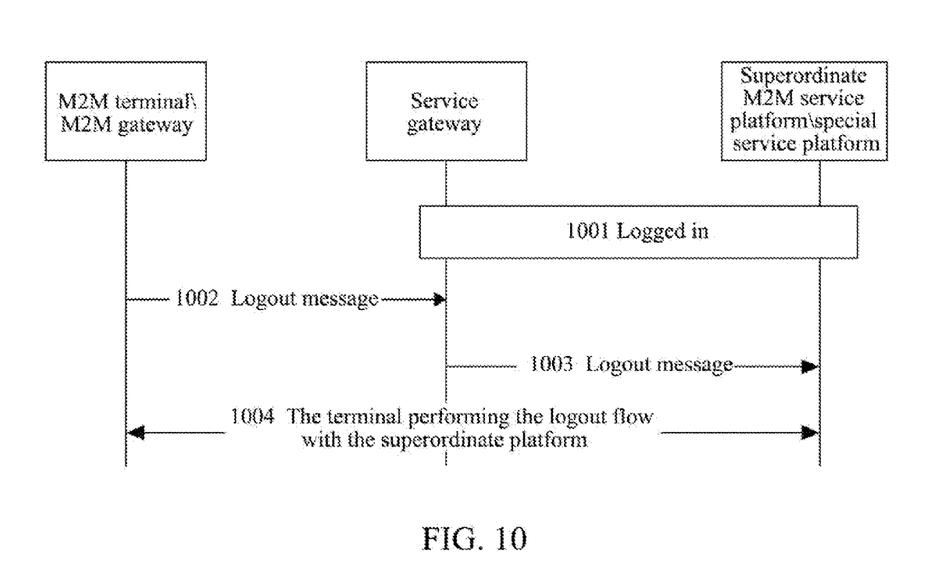
FIG. 10 is a flowchart of a terminal or gateway logging out to a service gateway according to an embodiment of the present invention.

FIG. 10 shows a flow of the M2M terminal or M2M terminal gateway device logging out to the service gateway, which comprises the following steps.

1001, the service gateway has logged in to the superordinate M2M service platform and has established a connection;

1002, the M2M terminal or M2M terminal gateway device sends a logout message to the service gateway to request for logout, and the logout message includes logout information such as the identifier of the M2M terminal or M2M terminal gateway device, application identifier and password;

1003, the service gateway forwards the logout message to the superordinate M2M service platform or special service platform;

1004, the superordinate M2M service platform or special service platform implements the logout flow with the M2M terminal or gateway, and the specific mechanism is the same as in step 903.

Figure 11:
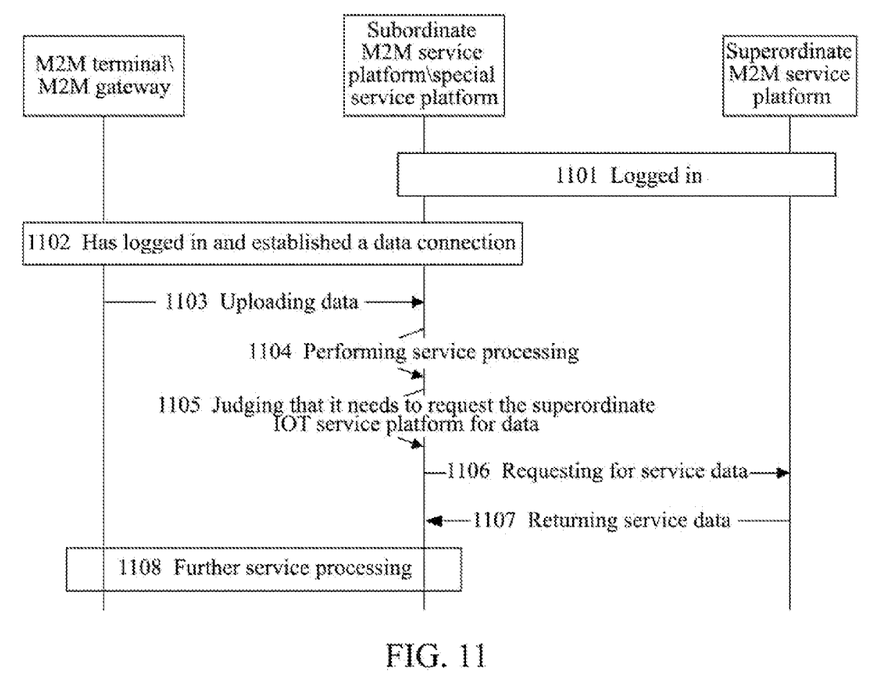
FIG. 11 is a flowchart of a terminal or gateway uploading data to a platform and obtaining service data from a superordinate platform according to an embodiment of the present invention.

FIG. 11 is a flowchart of the M2M terminal or M2M terminal gateway device uploading data to the platform, which comprises the following steps.

1101, the subordinate M2M service platform or special service platform has logged in to the superordinate M2M service platform and has established a connection;

1102, the M2M terminal or M2M terminal gateway device logs in to the subordinate M2M service platform or special service platform, and establishes a data connection;

1103, the M2M terminal or M2M terminal gateway device uploads terminal service data to the subordinate M2M service platform or special service platform;

1104, the subordinate M2M service platform or special service platform implements service processing;

1105, the subordinate M2M service platform or special service platform judges that it needs to request the superordinate M2M service platform for service data, including one or more of: M2M service policy, M2M service parameter, M2M service configuration parameter, M2M service content and M2M service subscription data, and so on;

1106, the subordinate M2M service platform or special service platform requests the superordinate M2M service platform for service data;

1107, the superordinate M2M service platform issues the related data to the subordinate M2M service platform or special service platform;

1108, the subordinate M2M service platform or special service platform completes service interaction with the M2M terminal or M2M terminal gateway device.

Figure 12:
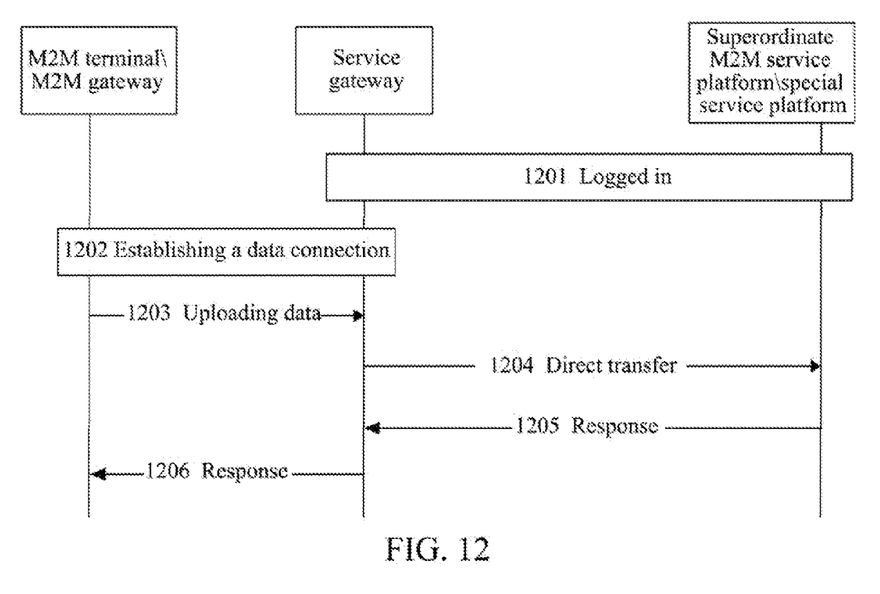
FIG. 12 is a flowchart of a terminal or gateway reporting service data to a service gateway according to an embodiment of the present invention.

FIG. 12 is a flowchart of the M2M terminal or M2M terminal gateway uploading data to the service gateway, which comprises the following steps.

1201, the service gateway has logged in to the superordinate M2M service platform or special service platform and has established a connection;

1202, the M2M terminal or M2M terminal gateway device logs in to the service gateway and establishes a data connection;

1203, the M2M terminal or M2M terminal gateway device uploads terminal service data to the service gateway;

1204, the service gateway forwards the service data to the superordinate M2M service platform or special service platform;

1205, the superordinate M2M service platform implements service processing, and then responds to service gateway; in this step, the superordinate M2M service platform or special service platform judges whether the processing is to be implemented by the present M2M service platform or special service platform according to the related information in the data, for example, one or more of M2M gateway device identifier, M2M gateway device type, M2M terminal identifier, M2M terminal type, application type, application identifier and subscription information; if not, the data are uploaded to a superordinate M2M service platform or special service platform.

1206, the service gateway responds to the M2M terminal or M2M gateway device.

The above examples are only preferred examples of the present invention, and are not used to limit the present invention. For a person skilled in the art, the present invention may have various modifications and changes. Further, the above description is only based on M2M, and the present invention is also applicable to other IOT networks such as ubiquitous network and sensor network. In this case, the M2M terminal is equivalent to other IOT terminals, for example ubiquitous network terminals; the M2M terminal gateway is equivalent to other IOT terminal gateways, for example ubiquitous network terminal gateways, IOT gateways, ubiquitous network gateways or sensor gateways, etc.; the M2M service platform is equivalent to a ubiquitous network service platform. Any modification, equivalent substitution, improvement and so on made within the spirit and principle of the present invention shall fall within the protection scope of the present invention.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The present invention is not limited to any particular form of combination of hardware and software.

INDUSTRIAL APPLICABILITY

In the present invention, the multiple levels of network service platforms are deployed distributed, each level of platform is provided with the same or differentiated service platform functions to provide development of IOT services by coordination, and multiple levels of IOT service platforms are deployed and the IOT terminals of the whole network are managed level to level, thus solving the problems of the IOT terminals that the regional span is large, the number of application types is big, and the load is not balanced, and the deployed industry or special service platforms can be fused into a unified architecture, the IOT service applications of large data volume and high real time can be implanted separately, thus reducing the load of the IOT service platforms.

What is claimed is:

1. An architecture of an internet of things (IOT), comprising:
    multiple levels of IOT service platforms, wherein a superordinate IOT service platform is configured to manage one or more of the following function entities: an IOT terminal, an IOT terminal gateway, a subordinate IOT service platform, a special service platform and a service gateway;
    wherein the superordinate IOT service platform accesses the subordinate IOT service platform or special service platform, and provides functions of registration, login and logout for the subordinate IOT service platform or special service platform and\or service gateway, and the superordinate IOT service platform manages the registration information of the subordinate IOT service platform or special service platform or service gateway; and
    the IOT service platforms, the special service platform and service gateway all provide functions including registration, login, logout and service processing to the IOT terminal or IOT terminal gateway.

2. The architecture according to claim 1, wherein,
    the special service platform is configured to provide one or more of the following functions: video service, audio service, streaming media service, large data volume service, high real time service and industry application;
    the service gateway is configured to converge data.

3. The architecture according to claim 1, wherein,
    service data provided by the superordinate IOT service platform for the subordinate IOT service platform and\or special service platform further comprise at least one of: service policy, service parameter, service configuration parameter, service content and service subscription data.

4. The architecture according to claim 1, wherein,
    the IOT service platform or the special service platform is configured to provide registration to the IOT terminal and IOT terminal gateway in the following manner:
    judging whether a registration message is to be processed by the IOT service platform or the special service platform;
    if yes, processing the registration message for the IOT terminal or IOT terminal gateway; if not, delivering the registration message to a superordinate IOT service platform or special service platform.

5. The architecture according to claim 1, wherein,
    the service gateway is configured to provide registration to the IOT terminal and the IOT terminal gateway in the following manner:
    receiving a registration message sent from the IOT terminal or the IOT terminal gateway; and
    delivering the registration message to a superordinate IOT service platform or special service platform of the service gateway.

6. The architecture according to claim 1, wherein,
    the IOT service platform or the special service platform is configured to provide login to the IOT terminal and the IOT terminal gateway in the following manner:
    receiving a login message sent from the IOT terminal or the IOT terminal gateway to the IOT service platform or the special service platform; and
    the IOT service platform or the special service platform judging whether the login message is to be processed by the IOT service platform or the special service platform;
    if yes, the IOT service platform or the special service platform processing the login message for the IOT terminal or the IOT terminal gateway; if not, delivering the login message to a superordinate IOT service platform of the IOT service platform and the special service platform, or the IOT service platform delivering the login message to the special service platform.

7. The architecture according to claim 1, wherein,
    the service gateway is configured to provide login to the IOT terminal and the IOT terminal gateway in the following manner:
    receiving a login message sent from the IOT terminal or the IOT terminal gateway; and
    delivering the received login message to a superordinate IOT service platform or special service platform.

8. The architecture according to claim 1, wherein,
    the IOT service platform or the special service platform is configured to provide logout to the IOT terminal and the IOT terminal gateway in the following manner:
    receiving a logout message sent from the IOT terminal or the IOT terminal gateway; and
    judging according to the logout message whether the logout message is to be processed by the IOT service platform or the special service platform for the IOT terminal or the IOT terminal gateway;

if yes, the IOT service platform or the special service platform processing the logout message for the IOT terminal or IOT terminal gateway; if not, delivering the logout message to a superordinate IOT service platform or special service platform.

9. The architecture according to claim 1, wherein,
the service gateway is configured to provide logout to the IOT terminal and the IOT terminal gateway in the following manner:
receiving a logout message sent from the IOT terminal or the IOT terminal gateway; and
delivering the logout message to a superordinate IOT service platform or special service platform.

10. The architecture according to claim 4, wherein,
the IOT service platform or the special service platform is configured to make the judgment according to one or more of the following information in the message sent by the IOT terminal or the IOT terminal gateway:
IOT gateway device identifier, IOT gateway device type, IOT terminal identifier, IOT terminal type, application type, application identifier and subscription information.

11. The architecture according to claim 1, wherein,
the IOT comprises one or more of M2M network, ubiquitous network and sensor network.

12. A method for implementing an internet of things (JOT) service, comprising the following steps:
a superordinate IOT service platform providing management for one or more of a subordinate IOT service platform, a special service platform and a service gateway, wherein the management comprises one or more of: registration, login, logout, data synchronization and heartbeat;
wherein the superordinate IOT service platform accesses the subordinate IOT service platform or special service platform, and provides functions of registration, login and logout for the subordinate IOT service platform or special service platform and\or service gateway, and the superordinate IOT service platform manages the registration information of the subordinate IOT service platform or special service platform or service gateway; and
the IOT service platforms, the special service platform and service gateway all provide functions including registration, login, logout and service processing to the IOT terminal or IOT terminal gateway.

13. The method according to claim 12, further comprising:
the superordinate IOT service platform providing one or more of the subordinate IOT service platform, the special service platform and the service gateway with one or more of the following data:
IOT service policy, IOT service parameter, IOT service configuration parameter, IOT service content and IOT service subscription data.

14. The method according to claim 12, further comprising:
the IOT service platform and\or the special service platform judging whether a message or data sent from the IOT terminal or the IOT terminal gateway is to be processed by the IOT service platform and\or the special service platform according to one or more of the following data:
IOT gateway device identifier, IOT gateway device type, IOT terminal identifier, IOT terminal type, application type, application identifier and subscription information.

15. The method according to claim 12, wherein, the IOT comprises one or more of M2M network, ubiquitous network and sensor network.

16. The architecture according to claim 6, wherein,
the IOT service platform or the special service platform is configured to make the judgment according to one or more of the following information in the message sent by the IOT terminal or the IOT terminal gateway:
IOT gateway device identifier, IOT gateway device type, IOT terminal identifier, IOT terminal type, application type, application identifier and subscription information.

17. The architecture according to claim 8, wherein,
the IOT service platform or the special service platform is configured to make the judgment according to one or more of the following information in the message sent by the IOT terminal or the IOT terminal gateway:
IOT gateway device identifier, IOT gateway device type, IOT terminal identifier, IOT terminal type, application type, application identifier and subscription information.

* * * * *